United States Patent [19]

Simpson

[11] 4,006,933
[45] Feb. 8, 1977

[54] UNITARY SUNSHIELD FOR AN AUTOMOBILE

[76] Inventor: Elwood J. Simpson, 29075 Clevis, Rancho Palos Verdes, Calif. 90274

[22] Filed: May 17, 1976

[21] Appl. No.: 687,362

[52] U.S. Cl. .............................. 296/95 R; 52/473; 49/62
[51] Int. Cl.² .............................................. B60J 1/20
[58] Field of Search ................ 296/95, 97 R, 97 A, 296/97 C; 52/473; 49/61, 62, 67, 71; D12/181, 182

[56] References Cited
UNITED STATES PATENTS

| | | | |
|---|---|---|---|
| 2,349,470 | 5/1944 | Stanfield | 49/62 |
| 2,492,909 | 12/1949 | Warp | 98/121 |
| 2,610,712 | 9/1952 | Hamrick | 52/473 |
| 2,759,413 | 8/1956 | Smith | 98/121 |
| 3,083,630 | 4/1963 | Thaxton | 98/2 |
| 3,302,554 | 2/1967 | Rousey | 98/121 |
| D240,125 | 6/1976 | Bolden | D12/181 |

OTHER PUBLICATIONS

"Torino," Advertisement from Motor Trend Magazine" Feb., 1970 issue, p. 34.

Primary Examiner—Philip Goodman
Assistant Examiner—John A. Carroll
Attorney, Agent, or Firm—Fulwider, Patton, Rieber, Lee & Utecht

[57] ABSTRACT

A sunshield is provided for an automotive vehicle formed from a single sheet of laminar material. A plurality of transverse louvers are formed in the sheet material in parallel alignment for horizontal orientation when mounted on the vehicle. Each of the louvers has a central portion which extends rearward from adjoining lateral portions. Longitudinally aligned stiffening ribs join and support each of the louvers at the demarkations between central and lateral portions to the louver immediately below and to the rear thereof, or to the border in the case of the lowest louver. Metal tabs are provided at predetermined intervals for securing the sunshield in position to cover the rear window of an automotive vehicle.

8 Claims, 9 Drawing Figures

U.S. Patent  Feb. 8, 1977  Sheet 1 of 2  4,006,933
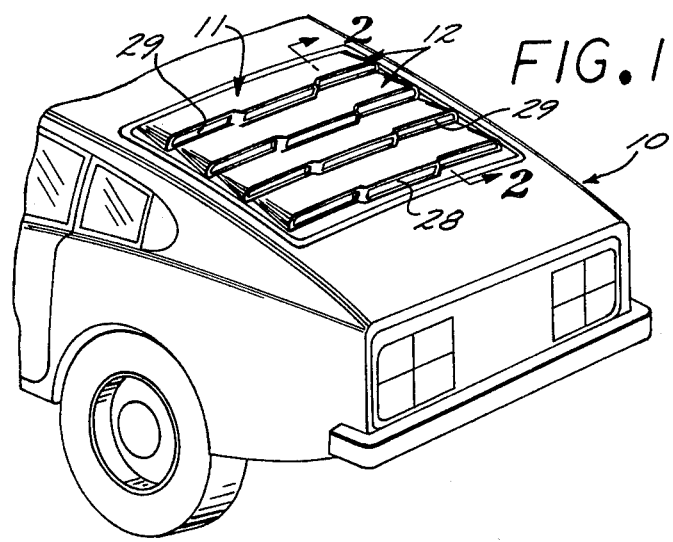
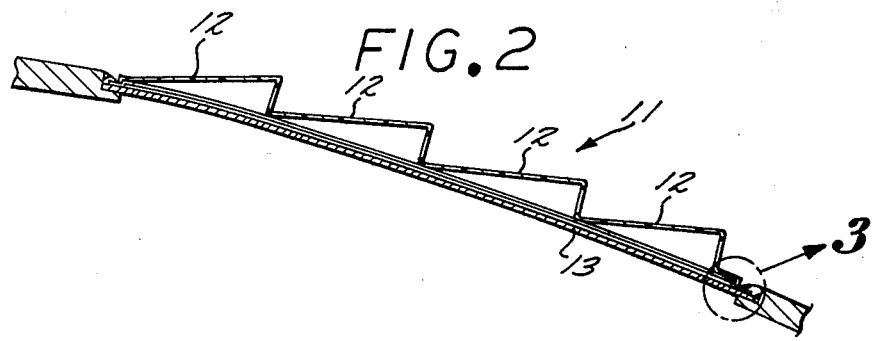
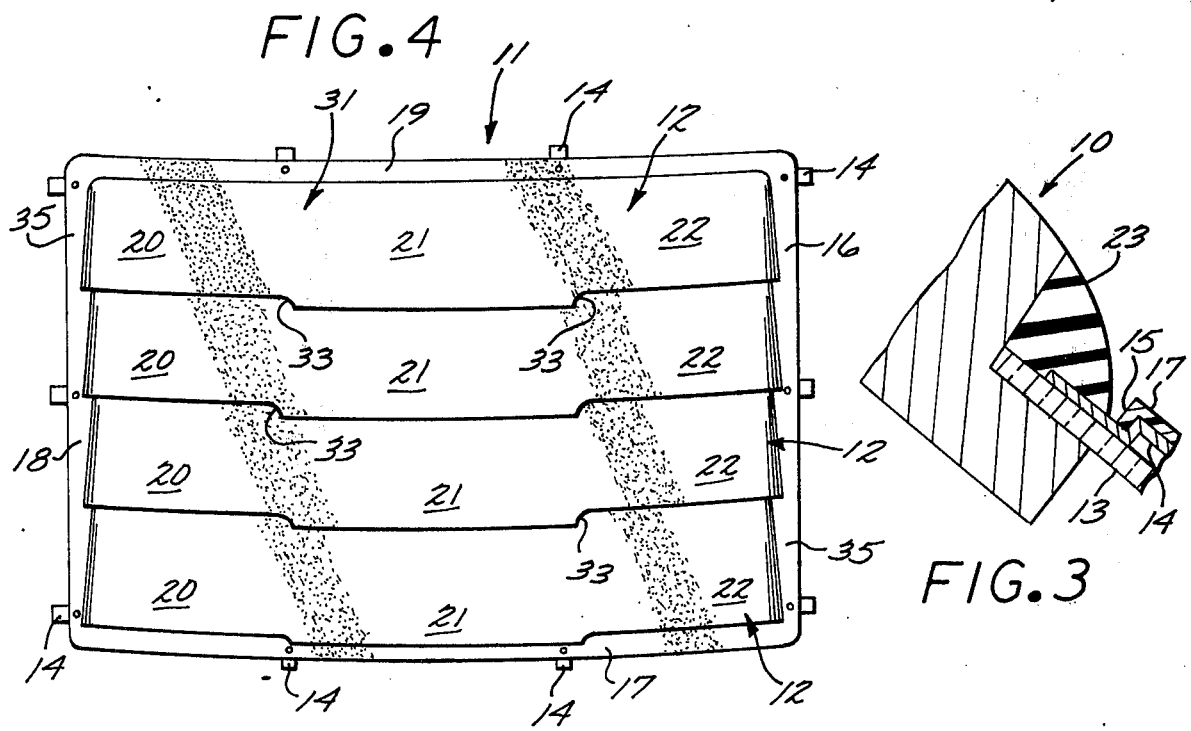

UNITARY SUNSHIELD FOR AN AUTOMOBILE

FIELD OF THE INVENTION

The invention relates to sunshields for use in covering the rear windows of automotive vehicles to reduce the direct sunlight passing through the rear window of the automotive vehicle into the interior of the vehicle. At the same time, the sunshield employs generally horizontal louvers which allows the vehicle occupants, and especially the driver of the vehicle to have a largely unobstructed view through the rear window of the automobile. Such sunshields are particularly useful in association with automobiles, and expecially hatchback or slantback automobiles, which have gained increased popularity in recent years.

BACKGROUND OF THE INVENTION

In conventional sunshields for use in association with the rear window of an automobile, a structure is usually provided which utilizes a number of slats or louvers fastened to a frame. The louvers are aligned substantially parallel to each other and with a generally horizontal orientation. This disposition reduces significantly the amount of direct sunlight passing through the rear windshield of the automobile. This is particularly desirable when used with slantback or hatchback automobiles in which the rear window has a very substantial horizontal component of orientation. The horizontal disposition of the louvers allows the vehicle occupants to look through the rear window of the automobile without a significant obstruction to their view.

Conventional sunshields, however, entail several disadvantages. They are usually formed with metal louvers which are attached to a framework that is fitted to the rear window of the vehicle. These sunshields are usually formed from a multiplicity of separate parts involving louver sections, frame sections, and vertical struts, all of which must be assembled together to form the complete structure. In addition, the metal louvers become quite hot in a direct sunlight, and so will burn the hand of any person inadvertently touching them.

The formation of sunshields for the rear windows of automobiles has been attempted using a single sheet of deformable material as the operative structure. However, the deformable material of choice is generally plastic, and the resultant sunshields formed in this manner have heretofore been structurally unsound. The structural inadequacies of previous sunshields which have been formed from a single unitary plastic structure is attributable to the transverse instability of the louvers formed. That is, because of the relatively wide distance to be spanned by the louvers, across the width of the rear window, the flexibility of the plastic material produces elastic deflections of the louvers in a vertical direction. This is particularly pronounced when the vehicle is proceeding over a rough road or rough terrain.

Attempts have been made to form supporting spacers or uprights between the louvers to provide necessary structural rigidity. However, one implementation of structural design requires that the unitary sheet from which the sunshield is formed by lengthened by the aggregate length of such supporting columns between the louvers. This is wasteful since the material laterally adjoining these spacers or columns must be discarded to provide the necessary apertures between louvers. Alternatively elaborate and expensive molds must be employed to initially form the required apertures.

An alternative form of such a structure stretches the available material the requisite distance so that the necessary supports are formed. However, the result frequently is a sunshield in which the supports between louvers have been stretched so thin as to be of little use. They are easily broken and then provide an unsightly appearance along with failing to provide the vertical support for which they were intended.

SUMMARY OF THE INVENTION

It is an object of the present invention to provide a sunshield for the rear window of an automotive vehicle having an operative element formed from a single laminar sheet of a deformable material with horizontally aligned louvers having intermediate vertical supports that prevent oscillation or flapping of the louvers as the vehicle travels.

A further object of the invention is to provide such a sunshield formed from a single laminar sheet of deformable material without the necessity of increasing the requisite length of the sheet of material to the extent that such vertical supports are provided between louvers.

An additional object of the invention is to provide a means for stiffening the structure of the sunshield. This is achieved by deforming the sheet of material forming the sunshield at the perimeter thereof and at the edges of the louvers formed therein. In this manner lips or rims are formed about the apertures between louvers and at the periphery of the structure of the sunshield.

An additional object of the invention is to provide supports between louvers which resist both lateral and vertical deflection of the louvers.

In a broad aspect this invention is a sunshield for the rear window of an automotive vehicle formed from a single laminar sheet of deformable material. The sheet is deformed to provide a border extending about the periphery of the sheet and having opposing longitudinal edges which, when mounted on the vehicle, slope up to a forward transverse edge and downward to a rear transverse edge. A plurality of transverse louvers are formed in the material. These louvers are of generally planar configuration oriented in mutually parallel horizontal alignment and extending between the opposing longitudinal edges of the border. Each louver is formed with a central portion and adjoining lateral portions wherein each central portion extends rearward from adjoining lateral portions to define longitudinal demarkations therebetween. Longitudinally aligned stiffening ribs extend vertically downward from each louver at the demarkation to join with the remaining structure of the sheet material to define a plurality of transverse apertures in the sheet material in association with each portion of each louver, below and to the rear thereof.

BRIEF DESCRIPTION OF THE DRAWINGS

The various features and advantages of the invention may be explained with greater clarity and particularity by reference to the accompanying drawings in which:

FIG. 1 is a perspective view of the rear of an automobile equipped with the structure of this invention.

FIG. 2 is a sectional view taken along the lines 2—2 of FIG. 1.

FIG. 3 is an enlarged sectional view of a portion of FIG. 2.

FIG. 4 is a top view of the sunshield of this invention.

DETAILED DESCRIPTION OF THE INVENTION

Figure 5:
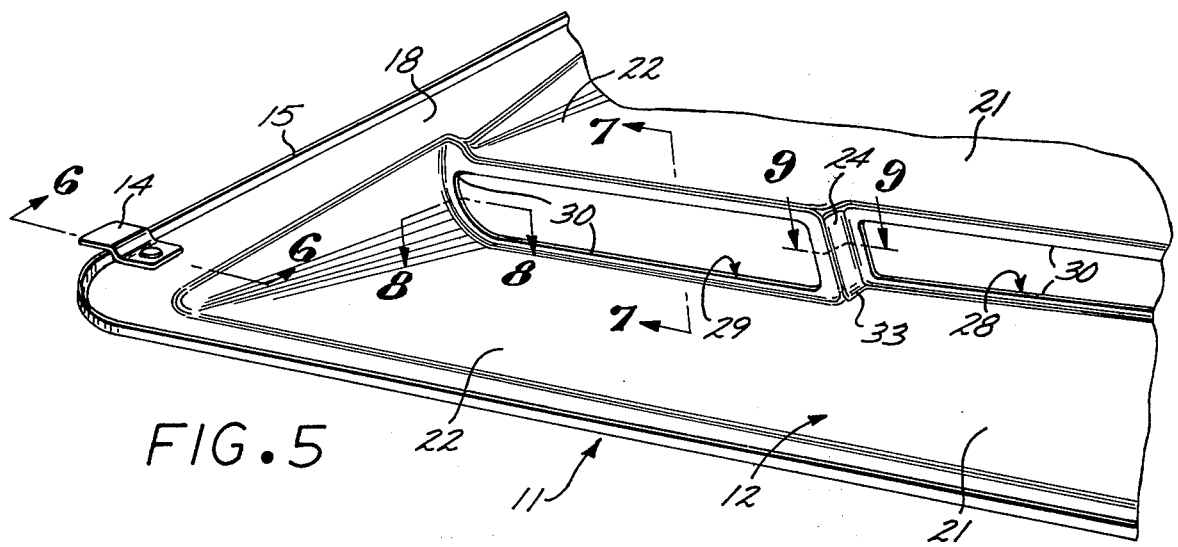
FIG. 5 is a perspective view of the underside of one corner of the sunshield of this invention.

Referring now to the drawings there is illustrated a hatchback automobile 10 equipped with the sunshield 11 of the present invention. The sunshield 11 is mounted on the rear window 13 of the automobile 10 and is formed from a single laminar sheet 31 of deformable material, preferably plastic. Appropriate plastics include acrononitrile-butadyene-styrene (ABS) and polyvinyl chloride (PVC). It is to be understood that the plastic material of choice should be ultraviolet loaded or provided with coloring agents or ultraviolet absorbers so that the color of the sunshield remains consistent with the color of the automobile 10 throughout prolonged use, as plastics otherwise do tend to discolor from extended exposure to the sun.

The sunshield 11 is formed with a border 35 extending about the perimeter of the sheet of material 31 and having opposing longitudinal edges 16 and 18 sloping up to a forward transverse edge 19 and downward to a rear transverse edge 17. A plurality of transverse louvers 12 of generally planar configuration are provided and extend between the opposing longitudinal edges 16 and 18 of the border. The transverse louvers 12 are of generally planar configurations and are oriented in mutually parallel horizontal alignment. Each of the louvers 12 has a central portion 21 and adjoining lateral portions 20 and 22.

As best illustrated in FIG. 4, it can be seen that each of the central portions 21 extends rearward from the adjoining lateral portions 20 and 22 to define demarkations therebetween, as indicated at 33. From the demarkations 33, stiffening ribs 24 extend vertically downward from each louver 12 to join with the remaining structure of the sheet 31 to define a plurality of transverse apertures 28 and 29 in the sheet 31 in association with each portion, 20, 21 and 22 of each louver 12 below and to the rear thereof.

Figure 9:
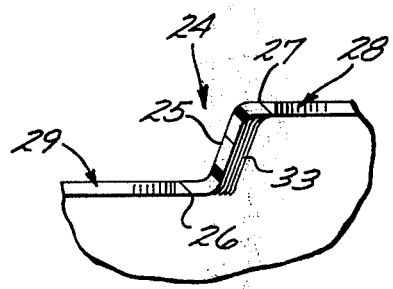
FIG. 9 is a sectional view taken at the lines 9—9 of FIG. 5.

Preferably, each of the ribs 24 is constructed with a cross section as illustrated in FIG. 9. This cross section includes a central element 25 generally longitudinally aligned along the direction of travel of the vehicle. Legs 26 and 27 of the ribs 24 extend in opposing transverse directions from the longitudinal extremities of the central element 25.

The ribs 24 on either side of the central portions 21 of the louvers 12 vertically approach the demarkations 33 in a converging fashion. In this manner, the ribs 24 and the louvers 12 define apertures 28 therebetween adjacent to the central portions 21 of the louvers. These apertures 28 are of generally trapezoidal shape and are located to the rear of and below the central portions 21 of each of the louvers 12. The configurations of the central apertures 28, as well as the adjacent apertures 29 is apparent from FIG. 5. In considering the geometry of the apertures, it should be borne in mind that FIG. 5 is a view of the underside of the sunshield 11.

Figure 6:
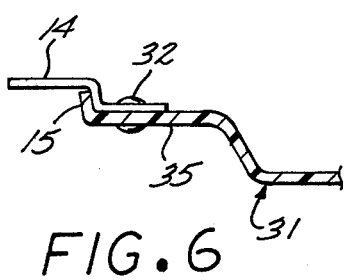
FIG. 6 is a sectional view taken at the lines 6—6 of FIG. 5.
Figure 7:
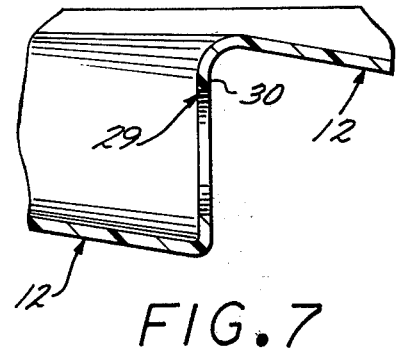
FIG. 7 is a sectional view taken on the lines 7—7 of FIG. 5.
Figure 8:
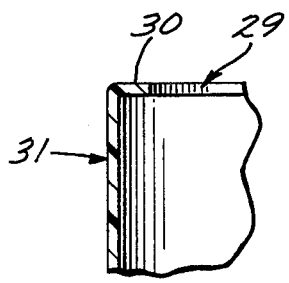
FIG. 8 is a sectional view taken along the lines 8—8 of FIG. 5.

A further desirable feature of the invention is the formation of the border and the edges of the louvers 12 bounding the apertures 28 and 29 wirh stiffening rims. For example, as illustrated in FIG. 8, the sheet 31 is formed with edges bent to form a stiffened lip or rim 30 adjacent to the apertures 28 and 29. Similarily, as illustrated in FIG. 7, the edges of the louvers 12 are bent during formation of the sunshield 11 to form continuations of the rims 30 which delineate the apertures 28 and 29. As illustrated in FIG. 6 the sheet 31 is formed with a border 35, the perimeter of which is bent to form a stiffening rim 15. The rims 15 and 30 thereby aid in structurally immobilizing the sunshield 11. A further feature of the invention is illustrated in FIGS. 3, 4, 5, and 6. Metal tabs 14 are located at predetermined intervals along the border 35 at longitudinal edges 16 and 18 and transverse forward and rear edges 19 and 17. These metal tabs 14 are conformed to the shape of the lip 15 and are secured to the edges of the border 35 of the sunshield 11 by means dof rivets 32. The metal tabs 14 are useful in securing the sunshield 11 to the automobile 10. The metal tabs 14 are placed in contact with the rear windshield 13, which in turn rests in a recess in the outer sheet metal surface of the automobile 10. The windshield 13 may be cemented at its underside and periphery to the recess or shoulder formed in the automobile 10. A waterproof rubber liner 23 is then sealed into position by cement that adheres to the automobile 10 and the metal tabs 14 as well as the glass windshield 13.

The foregoing embodiment of the invention as depicted in the drawings should be considered only as illustrating the various features and advantages of the invention. Structural details peculiar to the embodiment depicted should not be construed as a limitation of the invention. Rather, the invention is defined in the claims which are appended hereto.

I claim:

1. A sunshield for the rear window of an automotive vehicle formed from a single laminar sheet of deformable material to provide a border extending about the periphery thereof and having opposing longitudinal edges sloping up to a forward transverse edge and downward to a rear transverse edge; and wherein there are formed a plurality of transverse louvers of generally planar configuration oriented in mutually parallel horizontal alignment and extending between said opposing longitudinal edges of said border with each louver having a central portion and adjoining lateral portions wherein each central portion extends rearward from adjoining lateral portions to define demarkations between adjacent portions and longitudinally aligned stiffening ribs extend vertically downward from each louver at said demarkations to join with the remaining structure of said sheet to define a plurality of transverse apertures in said sheet in association with each portion of each louver below and to the rear thereof.

2. The apparatus of claim 1 wherein the perimeter of said border and the edges of said louver bounding said apertures are bent to form stiffening rims.

3. The apparatus of claim 1 wherein said sheet of deformable material is plastic.

4. The apparatus of claim 3 wherein said sheet of deformable material is acrononitrile-butadyene-styrene plastic.

5. The apparatus of claim 3 wherein said sheet is polyvinyl chloride plastic.

6. The apparatus of claim 3 further comprising metal tabs located at predetermined intervals along said border and secured thereto to extend outward therefrom for use in securing said sunshield to an automotive vehicle.

7. The sunshield of claim 1 further characterized in that each of said ribs is constructed with a cross section that includes a central generally longitudinal element with legs at the longitudinal extremities thereof extending in opposing transverse directions.

8. The sunshield of claim 7 wherein said ribs on either side of said central portions of said louvers vertically approach said demarkations in converging fashion, whereby said ribs and said louvers define apertures of generally trapezoidal shape to the rear of and below said central portions of said louvers.

* * * * *